United States Patent
Alkhatib et al.

(10) Patent No.: US 8,090,843 B2
(45) Date of Patent: Jan. 3, 2012

(54) CREATING A PUBLIC IDENTITY FOR AN ENTITY ON A NETWORK

(75) Inventors: Hasan S Alkhatib, Saratoga, CA (US); Fouad A Tobagi, Los Altos, CA (US)

(73) Assignee: Impro Network Facility, LLC, Wilmington, DE (US)

( * ) Notice: Subject to any disclaimer, the term of this patent is extended or adjusted under 35 U.S.C. 154(b) by 0 days.

(21) Appl. No.: 13/087,937

(22) Filed: Apr. 15, 2011

(65) Prior Publication Data

US 2011/0196945 A1    Aug. 11, 2011

Related U.S. Application Data

(62) Division of application No. 10/161,573, filed on Jun. 3, 2002, now Pat. No. 7,937,471.

(51) Int. Cl.
*G06F 15/16* (2006.01)

(52) U.S. Cl. ........................................ 709/227; 709/225

(58) Field of Classification Search .................. 709/225, 709/227–230
See application file for complete search history.

(56) References Cited

U.S. PATENT DOCUMENTS

| | | | |
|---|---|---|---|
| 5,159,592 A | 10/1992 | Perkins | |
| 5,361,256 A | 11/1994 | Doeringer | |
| 5,563,878 A | 10/1996 | Blakely | |
| 5,623,605 A | 4/1997 | Keshav | |
| 5,701,427 A | 12/1997 | Lathrop | |
| 5,717,686 A | 2/1998 | Schiavoni | |
| 5,717,687 A | 2/1998 | Minot | |
| 5,734,651 A | 3/1998 | Blakely | |
| 5,751,961 A | 5/1998 | Smyk | |
| 5,754,938 A | 5/1998 | Herz et al. | |
| 5,764,906 A | 6/1998 | Edelstein | |
| 5,777,989 A | 7/1998 | McGarvey | |
| 5,781,550 A | 7/1998 | Templin | |
| 5,790,548 A | 8/1998 | Sistainizadeh | |
| 5,793,763 A | 8/1998 | Mayes | |
| 5,805,818 A | 9/1998 | Perlman | |
| 5,805,820 A | 9/1998 | Bellovin | |
| 5,815,664 A | 9/1998 | Asano | |
| 5,826,014 A | 10/1998 | Coley et al. | |

(Continued)

FOREIGN PATENT DOCUMENTS

EP    0817444    1/1998

OTHER PUBLICATIONS

Venters, Demystifying Protocols: A comparison of Protocols Suitable for IP Telephony, Sonus Networks, pp. 1-11, 2000.

(Continued)

*Primary Examiner* — Faruk Hamza
(74) *Attorney, Agent, or Firm* — McAndrews Held & Malloy, Ltd.

(57) ABSTRACT

A system is disclosed for establishing a public identity for an entity on a private network. In one embodiment, a first entity can initiate a request to create a binding of a public address to a private address for itself. The existence of this public address for the first entity can be made known so that other entities can use the public address to communicate with the first entity. The present invention allows entities outside of a private network to initiate communication with an entity inside a private network.

21 Claims, 6 Drawing Sheets

U.S. PATENT DOCUMENTS

| | | | |
|---|---|---|---|
| 5,856,974 A | 1/1999 | Gervais | |
| 5,864,666 A | 1/1999 | Shrader | |
| 5,867,667 A | 2/1999 | Butman | |
| 5,884,038 A | 3/1999 | Kapoor | |
| 5,884,246 A | 3/1999 | Boucher | |
| 5,889,953 A | 3/1999 | Thebaut | |
| 5,897,662 A | 4/1999 | Corrigan | |
| 5,898,830 A | 4/1999 | Wesinger, Jr. et al. | |
| 5,913,210 A | 6/1999 | Call | |
| 5,937,162 A | 8/1999 | Funk | |
| 5,937,163 A | 8/1999 | Lee | |
| 6,003,084 A | 12/1999 | Green | |
| 6,006,272 A | 12/1999 | Aravamudan | |
| 6,032,196 A | 2/2000 | Monier | |
| 6,047,325 A | 4/2000 | Jain | |
| 6,055,236 A | 4/2000 | Nessett | |
| 6,055,575 A | 4/2000 | Paulsen | |
| 6,058,431 A | 5/2000 | Srisuresh et al. | |
| 6,061,349 A | 5/2000 | Colie | |
| 6,061,738 A | 5/2000 | Osaku | |
| 6,101,543 A | 8/2000 | Alden | |
| 6,119,171 A | 9/2000 | Alkhatib | |
| 6,122,276 A | 9/2000 | Boe et al. | |
| 6,128,664 A | 10/2000 | Yanagidate et al. | |
| 6,137,791 A | 10/2000 | Frid | |
| 6,154,777 A | 11/2000 | Ebrahim | |
| 6,154,839 A | 11/2000 | Arrow | |
| 6,173,399 B1 | 1/2001 | Gilbrech | |
| 6,219,715 B1 | 4/2001 | Ohno et al. | |
| 6,226,751 B1 | 5/2001 | Arrow et al. | |
| 6,243,749 B1 | 6/2001 | Sitaraman et al. | |
| 6,249,801 B1 | 6/2001 | Zisapel | |
| 6,266,707 B1 | 7/2001 | Boden et al. | |
| 6,304,906 B1 | 10/2001 | Bhatti et al. | |
| 6,353,614 B1 | 3/2002 | Borella | |
| 6,353,886 B1 | 3/2002 | Howard | |
| 6,381,638 B1 | 4/2002 | Mahler | |
| 6,421,732 B1 | 7/2002 | Alkhatib | |
| 6,430,622 B1 | 8/2002 | Aiken, Jr. | |
| 6,430,623 B1 | 8/2002 | Alkhatib | |
| 6,438,597 B1 | 8/2002 | Mosberger et al. | |
| 6,438,612 B1 | 8/2002 | Ylonen et al. | |
| 6,452,925 B1 | 9/2002 | Sistanizadeh et al. | |
| 6,457,061 B1 | 9/2002 | Bal | |
| 6,477,565 B1 | 11/2002 | Daswani et al. | |
| 6,480,508 B1 | 11/2002 | Mwikalo | |
| 6,490,289 B1 | 12/2002 | Zhang et al. | |
| 6,496,867 B1 | 12/2002 | Beser et al. | |
| 6,507,873 B1 | 1/2003 | Suzuki et al. | |
| 6,510,154 B1 | 1/2003 | Mayers | |
| 6,523,068 B1 | 2/2003 | Beser et al. | |
| 6,556,584 B1 | 4/2003 | Horsley et al. | |
| 6,557,037 B1 | 4/2003 | Provino | |
| 6,557,306 B1 | 5/2003 | Sekiya | |
| 6,591,306 B1 | 7/2003 | Redlich | |
| 6,594,704 B1 | 7/2003 | Birenback | |
| 6,618,757 B1 | 9/2003 | Babbitt | |
| 6,629,137 B1 | 9/2003 | Wynn | |
| 6,631,416 B2 | 10/2003 | Bendinelli et al. | |
| 6,651,101 B1 | 11/2003 | Gai | |
| 6,657,991 B1 | 12/2003 | Akgun et al. | |
| 6,662,223 B1 | 12/2003 | Zhang | |
| 6,697,377 B1 | 2/2004 | Ju | |
| 6,701,437 B1 | 3/2004 | Hoke et al. | |
| 6,708,219 B1 | 3/2004 | Borella | |
| 6,722,210 B2 | 4/2004 | Armstrong | |
| 6,731,642 B1 | 5/2004 | Borella | |
| 6,742,045 B1 | 5/2004 | Albert | |
| 6,747,979 B1 | 6/2004 | Banks | |
| 6,754,706 B1 | 6/2004 | Swildens | |
| 6,772,210 B1 | 8/2004 | Edholm | |
| 6,778,528 B1 | 8/2004 | Blair et al. | |
| 6,779,035 B1 | 8/2004 | Gbadegesin | |
| 6,781,982 B1 | 8/2004 | Borella et al. | |
| 6,832,322 B1 | 12/2004 | Boden | |
| 6,865,184 B2 * | 3/2005 | Thubert et al. | 370/401 |
| 6,948,003 B1 | 9/2005 | Newman et al. | |
| 6,961,783 B1 | 11/2005 | Cook et al. | |
| 6,970,941 B1 | 11/2005 | Caronni | |
| 6,973,485 B2 | 12/2005 | Ebata et al. | |
| 6,978,317 B2 * | 12/2005 | Anantha et al. | 709/249 |
| 6,981,020 B2 | 12/2005 | Miloslavsky et al. | |
| 6,982,953 B1 | 1/2006 | Swales | |
| 6,983,319 B1 | 1/2006 | Lu | |
| 6,993,012 B2 | 1/2006 | Liu | |
| 6,993,595 B1 | 1/2006 | Luptowski et al. | |
| 6,996,628 B2 | 2/2006 | Keane et al. | |
| 6,996,631 B1 | 2/2006 | Aiken et al. | |
| 7,003,481 B2 | 2/2006 | Banka et al. | |
| 7,010,702 B1 | 3/2006 | Bots | |
| 7,028,333 B2 | 4/2006 | Tuomenoksa et al. | |
| 7,028,334 B2 | 4/2006 | Tuomenoksa et al. | |
| 7,032,242 B1 | 4/2006 | Grabelsky | |
| 7,054,322 B2 | 5/2006 | D'Annunzio et al. | |
| 7,058,052 B2 | 6/2006 | Westphal | |
| 7,068,655 B2 | 6/2006 | March et al. | |
| 7,072,337 B1 | 7/2006 | Arutyunov et al. | |
| 7,072,935 B2 | 7/2006 | Kehoe et al. | |
| 7,085,854 B2 | 8/2006 | Keane et al. | |
| 7,092,390 B2 | 8/2006 | Wan | |
| 7,107,464 B2 | 9/2006 | Shapira | |
| 7,107,614 B1 | 9/2006 | Boden et al. | |
| 7,110,375 B2 | 9/2006 | Khalil et al. | |
| 7,120,676 B2 | 10/2006 | Nelson et al. | |
| 7,120,701 B2 * | 10/2006 | Warrier et al. | 709/245 |
| 7,133,368 B2 | 11/2006 | Zhang et al. | |
| 7,139,828 B2 * | 11/2006 | Alkhatib et al. | 709/230 |
| 7,181,542 B2 | 2/2007 | Tuomenoksa et al. | |
| 7,194,553 B2 | 3/2007 | Lucco | |
| 7,227,864 B2 | 6/2007 | Collins et al. | |
| 7,263,719 B2 | 8/2007 | Jemes et al. | |
| 7,327,721 B2 | 2/2008 | Balasaygun et al. | |
| 7,379,465 B2 * | 5/2008 | Aysan et al. | 370/409 |
| 7,424,737 B2 | 9/2008 | Wesinger et al. | |
| 7,490,151 B2 | 2/2009 | Munger et al. | |
| 7,526,658 B1 | 4/2009 | He et al. | |
| 7,606,191 B1 * | 10/2009 | Breau et al. | 370/328 |
| 7,609,701 B2 * | 10/2009 | Yang et al. | 370/395.52 |
| 7,653,747 B2 | 1/2010 | Lucco et al. | |
| 7,715,380 B2 * | 5/2010 | Somasundaram | 370/389 |
| 7,787,428 B2 | 8/2010 | Furukawa et al. | |
| 7,814,228 B2 | 10/2010 | Caronni et al. | |
| 7,814,541 B1 * | 10/2010 | Manvi | 726/15 |
| 7,840,701 B2 * | 11/2010 | Hsu et al. | 709/238 |
| 7,860,098 B1 * | 12/2010 | Biswas et al. | 370/392 |
| 2001/0027474 A1 | 10/2001 | Nachman et al. | |
| 2001/0050914 A1 | 12/2001 | Akahane et al. | |
| 2002/0013848 A1 | 1/2002 | Rene Salle | |
| 2002/0026525 A1 | 2/2002 | Armitage | |
| 2002/0053031 A1 | 5/2002 | Bendinelli et al. | |
| 2002/0056008 A1 | 5/2002 | Keane et al. | |
| 2002/0078198 A1 | 6/2002 | Buchbinder et al. | |
| 2002/0091859 A1 | 7/2002 | Tuomenoksa et al. | |
| 2002/0099937 A1 | 7/2002 | Tuomenoksa | |
| 2002/0103931 A1 | 8/2002 | Mott | |
| 2002/0133534 A1 | 9/2002 | Forslow | |
| 2003/0018912 A1 | 1/2003 | Boyle et al. | |
| 2003/0041091 A1 | 2/2003 | Cheline | |
| 2003/0041136 A1 | 2/2003 | Cheline | |
| 2003/0055978 A1 | 3/2003 | Collins | |
| 2003/0065785 A1 | 4/2003 | Jain | |
| 2003/0074472 A1 | 4/2003 | Lucco et al. | |
| 2003/0084162 A1 | 5/2003 | Johnson et al. | |
| 2003/0123421 A1 | 7/2003 | Feige et al. | |
| 2003/0131131 A1 | 7/2003 | Yamada et al. | |
| 2003/0152068 A1 | 8/2003 | Balasaygun et al. | |
| 2003/0208554 A1 | 11/2003 | Holder | |
| 2003/0212795 A1 | 11/2003 | Harris et al. | |
| 2003/0219000 A1 | 11/2003 | Magret | |
| 2004/0006708 A1 | 1/2004 | Mukherjee et al. | |
| 2004/0088542 A1 | 5/2004 | Daude | |
| 2004/0111612 A1 | 6/2004 | Choi et al. | |
| 2004/0148439 A1 | 7/2004 | Harvey | |
| 2004/0249911 A1 | 12/2004 | Alkhatib | |
| 2005/0177647 A1 * | 8/2005 | Anantha et al. | 709/249 |
| 2006/0190607 A1 | 8/2006 | Lowery et al. | |
| 2006/0195524 A1 | 8/2006 | Nichols et al. | |

| | | |
|---|---|---|
| 2006/0195539 A1 | 8/2006 | Nichols et al. |
| 2006/0212545 A1 | 9/2006 | Nichols et al. |
| 2006/0212599 A1 | 9/2006 | Lucco et al. |
| 2007/0286189 A1 | 12/2007 | Kreiner et al. |
| 2008/0232295 A1 | 9/2008 | Kreiner et al. |
| 2009/0116487 A1 | 5/2009 | Read |
| 2010/0218254 A1* | 8/2010 | Gray et al. .............. 726/23 |

OTHER PUBLICATIONS

Tsuchiya, et al., Extending the IP Internet Through Address Reuse, ACM SIGCOMM Computer Communication Review, pp. 16-33, Jan. 1993.

Francis, et al., IPNL: A Nat-Extended Internet Architecture, SIGCOMM'01, Aug. 27-31, 2001, pp. 69-79.

Yalagandula, et al., Transparent Mobility with Minimal Infrastructure, University of Texas at Austin, pp. 1-14, Jul. 2001.

Teraoka, et al. VIP: A Protocol Providing Host Mobility, Communications of the ACM, Aug. 1994/vol. 37, No. 8, pp. 67-75, 113.

Egevang, et al., The IP Network Address Translator (NAT), Networking Working Group, RFC 1631, May 1994, pp. 1-10.

Chatel, Classical Versus Transparent IP Proxies, Network Working Group, RFC 1919, Mar. 1996, pp. 1-35.

Finseth, An Access Control Protocol, Sometimes Called TACACS, Network Working Group, Jul. 1993, pp. 1-18.

Computer Networks, Third Edition, by Andrew S. Tanenbaum, 1996, pp. 643-670, 685-691.

Perkins, Mobile IP, IEEE Communications Magazine, May 1997, pp. 84-99.

"Inside Apple Talk", Second Edition, by G. Sidhu, R. Andrews, A. Oppenheimer, 1990.

"Excerpts from Help Section of Microsoft Outlook", pertaining to rules and forwarding email, 1-3.

Egevang, K et al., "The IP Network Address Translator (NAT)", (May 1994), 1-10.

Kessler, Gary "Mobile IP: Harbiner of Untethered Computing", http://ww.garykessler.net/librarymobileip.htm. (Jan. 20, 2004).

Rekhter, "Cisco Systems" Tag Switching Architecture Overview, Network Working Group, (Feb. 1997).

Kent, "Security Architecture for teh Internet Protocol", Network Working Group, (Nov. 1998).

"Non-Final Office Action", U.S. Appl. No. 10/233,288, (Dec. 21, 2009), 13 pages.

"Final Office Action", U.S. Appl. No. 10/403,518, (Feb. 2, 2010), 26 pages.

"Final Office Action", U.S. Appl. No. 10/403,829, (Feb. 23, 2010), 15 pages.

"Advistory Action", U.S. Appl. No. 10/403,829, (May 14, 2010), 2 pages.

"Final Office Action", U.S. Appl. No. 10/233,288, Aug. 3, 2010), 15 pages.

"Non-Final Office Action", U.S. Appl. No. 10/403,518, (Aug. 3, 2010 ), 30 pages.

"Final Office Action", U.S. Appl. No. 10/403,818, (Sep. 1, 2010), 6 pages.

"Advistory Action", U.S. Appl. No. 10/233,288, (Oct. 15, 2010), 3 pages.

"Non Final Office Action", U.S. Appl. No. 10/403,818, (Nov. 5, 2010), 5 pages.

"Non Final Office Action", U.S. Appl. No. 10/403,829, (Nov. 19, 2010), 19 pages.

"Computer Dictionary", Microsoft Press; 3rd Edition, (1997), p. 264.

* cited by examiner

CREATING A PUBLIC IDENTITY FOR AN ENTITY ON A NETWORK

CROSS REFERENCE TO RELATED APPLICATIONS

This application is a divisional of U.S. patent application Ser. No. 10/161,573, filed on Jun. 3, 2002, the entirety of which is incorporated herein by reference. This application is also related to the following patents/applications:

DOMAIN NAME ROUTING, Hasan S. Alkhatib, U.S. Pat. No. 6,119,171;

IPNET GATEWAY, Hasan S. Alkhatib and Bruce C. Wootton, U.S. application Ser. No. 09/167,709, filed on Oct. 6, 1998; and PSEUDO ADDRESSING, Wootton, et al., U.S. application Ser. No. 09/637,803, filed on Aug. 11, 2000.

Each of the related Patents/Applications are incorporated herein by reference.

BACKGROUND OF THE INVENTION

1. Field of the Invention

The present invention is directed to technology for creating a public identity for an entity on a network.

2. Description of the Related Art

Most machines on the Internet use the Transmission Control Protocol/Internet Protocol (TCP/IP) reference model to send data to other machines on the Internet. The TCP/IP reference model includes four layers: the physical and data link layer, the network layer, the transport layer, and the application layer. The physical layer portion of the physical and data link layer is concerned with transmitting raw bits over a communication channel. The data link portion of the Physical and Data Link layer takes the raw transmission facility and transforms it into a line that appears to be relatively free of transmission errors. It accomplishes this task by having the sender break the input data up (or encapsulate) into frames, transmit the frames, and process the acknowledgment frames sent back by the receiver.

The network layer permits a host to inject packets into a network and have them travel independently to the destination. On the Internet, the protocol used for the network layer is the Internet Protocol (IP).

The transport layer is designed to allow peer entities on the source and destination to carry on a "conversation." On the Internet, two protocols are used. The first one, the Transmission Control Protocol (TCP), is a reliable connection-oriented protocol that allows a byte stream originating on one machine to be delivered without error to another machine on the Internet. It fragments the incoming byte stream into discrete packets and passes each one to the network layer. At the destination, the receiving TCP process reassembles the received packets into the output stream. TCP also handles flow control to make sure a fast sender cannot swamp a slow receiver with more packets than it can handle and manages congestion. The second protocol used in the transport layer on the Internet is the User Datagram Protocol (UDP), which does not provide the TCP sequencing or flow control. UDP is typically used for one-shot, client server type requests-reply queries for applications in which prompt delivery is more important than accurate delivery.

The transport layer is typically thought of as being above the network layer to indicate that the network layer provides a service to the transport layer. Similarly, the transport layer is typically thought of as being below the application layer to indicate that the transport layer provides a service to the application layer.

The application layer contains the high level protocols, for example, Telnet, File Transfer Protocol (FTP), Electronic Mail—Simple Mail Transfer Protocol (SMTP), and Hypertext Transfer Protocol (HTTP).

To transmit data from a source to a destination, the Internet Protocol uses an IP address. An IP address is four bytes long, and consists of a network number and a host number. When written out, IP addresses are specified as four numbers separated by dots (e.g. 198.68.70.1). Users and software applications do not always refer to hosts or other resources by their numerical IP address. Instead of using numbers, they use ASCII strings called domain names. The Internet uses a Domain Name System (DNS) to convert a domain name to an IP address.

The Internet Protocol has been in use for over two decades. It has worked extremely well, as demonstrated by the exponential growth of the Internet. Unfortunately, the Internet is rapidly becoming a victim of its own popularity: it is running out of addresses.

One proposed solution to the depleting address problem is Network Address Translation (NAT). This concept includes predefining a number of network addresses to be private addresses. The remainder of the addresses is considered global or public addresses. Public addresses are unique addresses that should only be used by one entity having access to the Internet. That is, no two entities on the Internet should have the same public address. Private addresses are not unique and are typically used for entities not having direct access to the Internet. Private addresses can be used by more than one organization or network. In the past, a private address could not be used to route on the Internet. NAT assumes that all of the machines on a network will not need to access the Internet at all times. Therefore, there is no need for each machine to have a public address. A local network can function with one or a small number of public addresses assigned to one or more gateway computers. The remainder of the machines on the network will be assigned private addresses. Since entities on the network have private addresses, the network is considered to be a private network.

When a particular machine having a private address on the private network attempts to initiate a communication with a machine outside of the private network (e.g. via the Internet), the gateway machine will intercept the communication, change the source machine's private address to a public address, change the port number and set up a table for translation between public addresses and private addresses. The table can contain the destination address, port numbers, sequencing information, byte counts and internal flags for each connection associated with a host address. Inbound packets are compared against entries in the table and permitted through the gateway only if an appropriate connection exists to validate their passage. One problem with the NAT approach is that it only works for communication initiated by a host within the private network to a host on the Internet which has a public IP address. The NAT approach specifically will not work if the communication is initiated by a host outside of the private network and is directed to a host with a private address in the private network.

Another problem is that mobile computing devices can be moved to new and different networks, including private networks. These mobile computing devices may need to be reachable so that a host outside of the private network can initiate communication with the mobile computing device. However, in this case the problem is two-fold. First, there is no means for allowing the host outside of the private network to initiate communication with the mobile computing device in the private network. Second, the host outside the private network does not know the address for the mobile computing device or the network that the mobile computing device is currently connected to.

SUMMARY OF THE INVENTION

The present invention, roughly described, pertains to a system for establishing a public identity for an entity on a network. A first entity can initiate a request to create a binding of a public address to a private address for itself. The existence of this public address for the first entity can be made known so that other entities can use the public address to communicate with the first entity. The present invention allows entities outside of a private network to initiate communication with an entity inside the private network.

One embodiment of the present invention includes a first entity electronically requesting a public address for itself. The first entity has a private address prior to requesting the public address. The first entity electronically receives and stores the public address, and communicates using the public address. In one implementation, the first entity connected to the network and received the private address for the network prior to requesting the public address.

In some embodiments, the first entity publishes its public address for other entities to find. For example, the public address can be stored in a DNS resource record or on a server connected to the Internet for purposes of storing public identities. Using the first entity's domain name, or another identifier, other entities can find the public address for the first entity and initiate communication with the first entity.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

Figure 1:
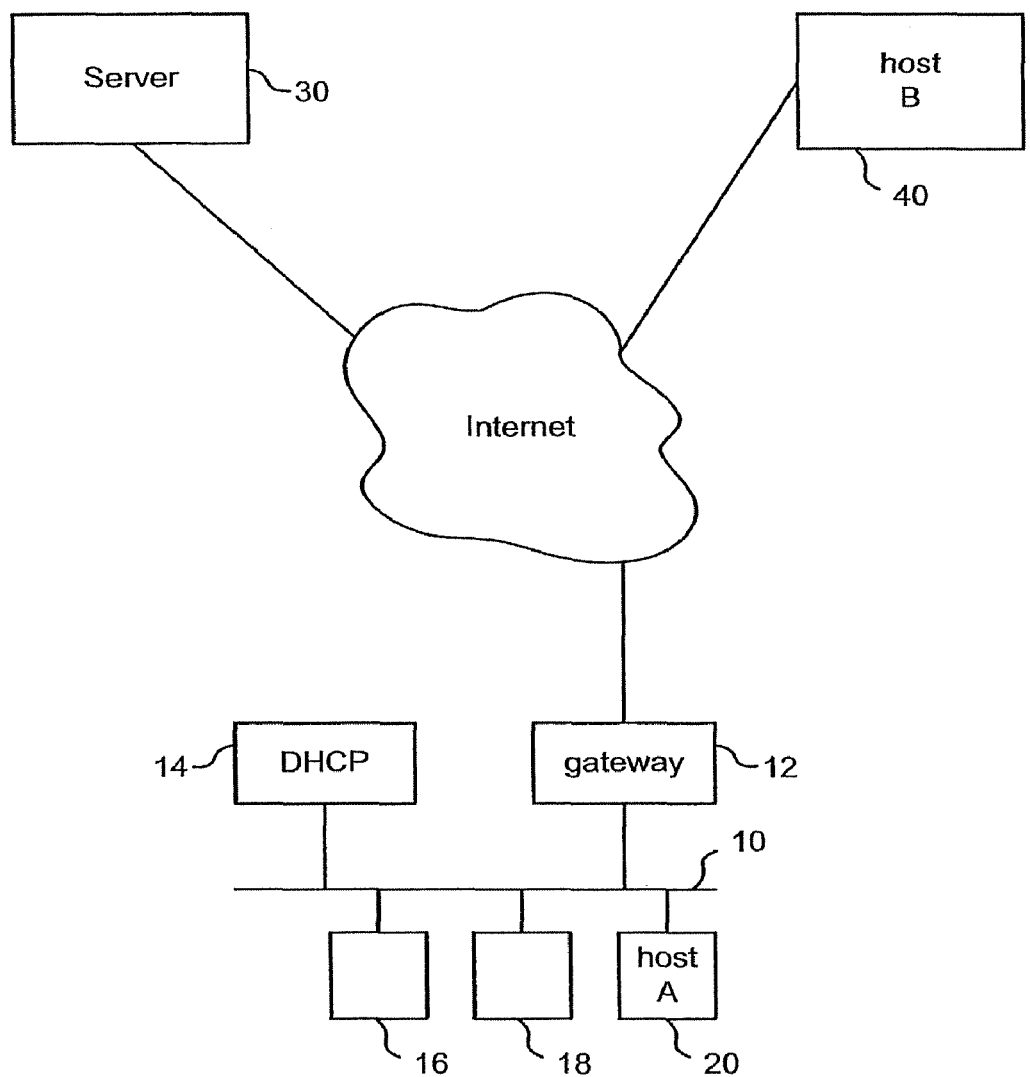
FIG. 1 depicts a block diagram of one embodiment of the components of the present invention.

FIG. 1 is a block diagram of one embodiment of the components of the present invention. FIG. 1 shows private network 10 in communication with the Internet. In addition to the Internet, the present invention can be used with other networks. The components connected to private network 10 include gateway (or edge) device 12, DHCP server 14, entity 16, entity 18, and entity 20. Gateway 12 provides an interface to the Internet. In one embodiment, gateway 12 implements NAT. FIG. 1 shows entity 20 labeled as host A. Thus, host A is an entity in (or connected to) a private network. In one embodiment, host A is a mobile computing device. When host A connects to private network 10, it is assigned a private address by DHCP server 14. In one embodiment, host A needs use of a public address to communicate on the Internet. FIG. 1 also shows server 30 and host B 40 connected to Internet.

The various components of FIG. 1 can include any suitable device that can communicate on a network, including mobile and non-mobile computing devices such as desktop computers, laptop computers, telephones, handheld computing devices, network appliances, servers, routers, gateways, etc. In one embodiment, each (or some) of the entities has a communication device (e.g. network interface), one or more storage devices, I/O devices and one or more processors in communication with the communication device, storage devices and I/O devices. The one or more processors are programmed to implement the present invention. All or part of the invention can include software stored on one or more storage devices to program the one or more processors. The invention can also be implemented using dedicated or custom built hardware. The entities can also be a process, thread, etc.

In one embodiment of the present invention, host A is assigned a private address from DHCP server 14 upon connection to network 10. Host A subsequently requests gateway 12 to provide host A with a public address and to bind that public address to the private address for host A. Host A subsequently publishes its new public address with server 30. Host B is a computer (or other entity) with a public IP address. Host B knows the domain name for host A; however, host B does not know an address for host A. According to the present invention, host B requests server 30 to resolve the domain name for host A. Server 30 responds to host B's request by returning the new public address for host A. Host B creates a communication for host A and sends that communication to host A using the public address received from server 30.

Figure 2:
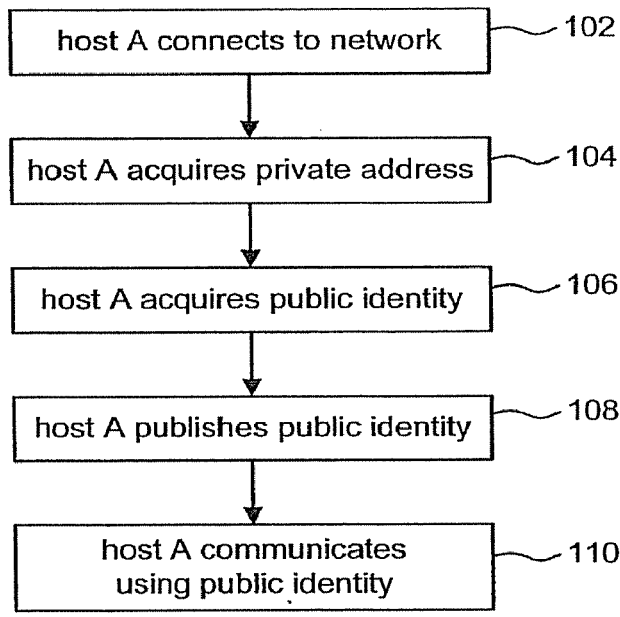
FIG. 2 is a flow chart describing one embodiment of the present invention.

The present invention pertains to the creation of a binding of a public identity to a private identity for an entity on a network. For the current state of the Internet, domain names, private IP addresses and public IP addresses can be used. For other networks, protocols, configurations, situations and scenarios, identifiers other than domain names and IP addresses can be used according to the present invention. For purposes of this document, the term "address" has a broader meaning than the concept of an IP address. That is, the term "address" is used in this document to mean something that is used to locate or identify an entity or thing FIG. 2 is a flow chart describing one embodiment of the present invention. In step 102, host A connects to network 10. In one embodiment, host A is a mobile computing device (e.g. laptop, handheld computing device, telephone, etc.) and step 102 includes physically connecting to network 102. Step 102 can also include turning on the power for a computing device and/or the computing device becoming active on network 10. In step 104, host A acquires a private address. In one embodiment, host A uses DHCP to obtain a private address from DHCP server 14. Other means for obtaining a private address can also be used. Additionally, the present invention will also work with a computing device that has a static private IP addresses. In step 106, host A acquires a public identity. One example of a public identity is a public address. In step 108, host A publishes its public identity. By publish, is meant that host A makes its public identity available to other entities. In one embodiment, publishing includes informing a server available on the Internet of the new public IF address for host A. In step 110, host A uses its public identity to communicate with other entities outside of the private network. In one embodiment, the new public address for host A is temporary. That is, host A will use this address for a finite amount of time and then stop using the public address. For example, if host A is a laptop computer, host A may be connected to the private network for one day and, therefore, would only use the public address for one day. Thereafter, host A would be connected to a different network and may use a different public address.

Figure 3:
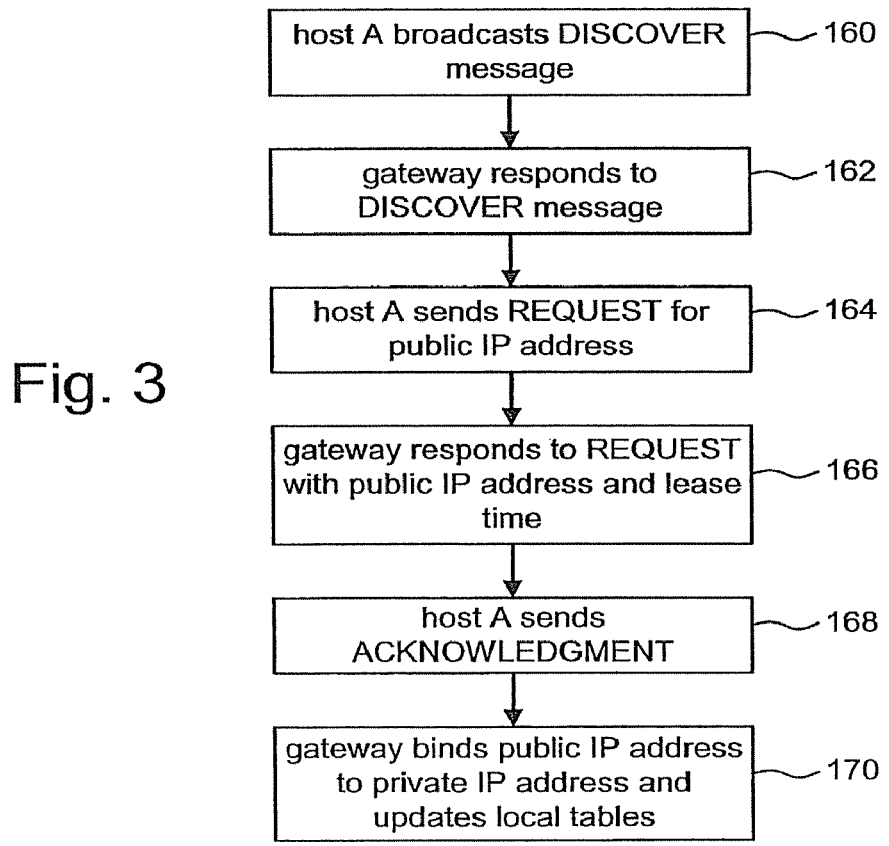
FIG. 3 is a flow chart describing one embodiment of a process for acquiring a public address.

FIG. 3 is a flowchart that explains one embodiment of the process of acquiring a public identity (step 106 of FIG. 2). In step 160, host A broadcasts a DISCOVER message. In one embodiment, host A will acquire its public address from gateway 12. Host A communicates with gateway 12 using a newly designed protocol. Each message of the newly designed protocol will be sent in the payload of a UDP segment. The newly designed protocol will include a set of codes, including DISCOVER address server, RESPONSE TO DISCOVER, REQUESTS FOR ADDRESS, RESPONSE TO REQUEST FOR ADDRESS, ACKNOWLEDGMENT and RELINQUISH ADDRESS. The code DISCOVER is used to discover an address server that will supply the public address. It is assumed that if a mobile (or non-mobile) computing device connects to a new private network, that device does not know what entity on the network will be supplying the public address. Therefore, in step 160, host A broadcasts a DISCOVER message to every entity on private network 10. Only gateway 12, the entity providing public addresses according to the present invention in the current example, will respond to the DISCOVER message (step 162). Upon receiving the response from gateway 12, host A now knows the address for the server supplying the public addresses. In step 164, host A sends a REQUEST FOR ADDRESS to gateway 12. Gateway 12 will receive that request, and if it has addresses to provide, gateway 12 will respond to the request in step 166. The response will identify the public IF address offered to host A and will indicate a lease time. The lease time indicates how long host A may continue to use the public address. Host A will store the public address and lease time, and send an ACKNOWLEDGMENT in step 168.

Upon receiving the ACKNOWLEDGEMENT, gateway 12 will bind the public address offered to host A to the private address for host A. Additionally, local tables that need to be updated will be updated. For example, in one embodiment gateway 12 (or another entity on network 10) will maintain a table that associates IP addresses with MAC addresses (e.g. addresses of Ethernet devices). Such a table will be updated to associate the MAC address for host A with the new public IP address for host A. Other tables may also be updated, as suitable for the particular implementation. In other embodiments, gateway 12 can assign public IP addresses in a manner more similar to DHCP.

In one embodiment, host A has a domain name and one or more DNS resource records stored on the Internet according to the standard Domain Name System. One embodiment of publishing the new public IP address for host A (step 108 of FIG. 2) is to update the resource records for host A.

Resource records are used to resolve a domain name. A resolver process converts the domain name to an IP address. Entities that have public addresses and communicate on the Internet have a set of resource records associated with it. When a resolver process gives a domain name to the domain name system, it gets back the resource records associated with that domain name.

A resource record has five fields: domain name, time to live, class, type and value. The time to live field provides an indication of how stable the record is. Information that is highly stable is assigned a large value such as the number of seconds in a day. The third field is the class. For the Internet the class is IN. The fourth field indicates the type of resource record. One domain may have many resource records. There are at least eight types of resource records that are of interest to this discussion: SOA, A, MX, NS, CNAME, PTR, HINFO, and TXT. The value field for an SOA record provides the name of the primary source of information about the name server zone, e-mail address of its administrator, a unique serial number and various flags and time outs in the value field. The value field for an A record holds a 32 bit IP address for the host. The value field for the MX record holds the domain name of the entity willing to accept e-mail for that particular domain name. The NS record specifies name servers. The CNAME record allows aliases to be created in the value field. A PTR record points to another name in the value field, which allows look up of an IP address for a particular domain name. The value field of the HINFO record indicates the type of machine and operating system that the domain name corresponds to. An example of resource records for a host is found below in Table 1.

TABLE 1

| Domain Name | Time to Live | Class | Type | Value |
|---|---|---|---|---|
| saturn.ttc.com | 86400 | IN | HINFO | Sun unix |
| saturn.ttc.com | 86400 | IN | A | 188.68.70.1 |
| saturn.ttc.com | 86400 | IN | MX | mars.ttc.com |

Table 1 includes three resource records for an entity with a domain name of saturn.ttc.com. The first resource record indicates a time to live of 86,400 seconds (one day). The type of record is HINFO and the value indicates that the entity is a Sun workstation running the UNIX operating system. The second line is a resource record of type A, which indicates that the IP address for saturn.ttc.com is 198.68.70.1. The third line indicates that e-mail for saturn.ttc.com should be sent to mars.ttc.com. It is likely that there will also be a DNS resource record that indicates the IP address for mars.ttc.com.

The DNS name space is divided into non-overlapping zones. Each zone is some part of the Internet space and contains name servers holding the authoritative information about that zone. Normally, a zone will have one primary name server and one or more secondary name servers which get their information from the primary name server. When a resolver process has a query about a domain name, it passes the query to one of the local name servers. If the host being sought falls under the jurisdiction of that name server, then that domain name server returns the authoritative resource record. An authoritative record is one that comes from the authority that manages the record. If, however, the host is remote and no information about the requested host is available locally, the name server sends a query message to the top level name server for the host requested. The top level name server will then provide the resource records to the local name server which may cache the information and forward it to the original resolver process. Since the cached information in the local name server is not the authoritative record, the time to live field is used to determine how long to use that information. The resource records for host A can be updated by using Dynamic DNS or other protocols/methods known in the art.

Another embodiment of publishing the new public IP address for host A (step 108 of FIG. 2) is to have a server keep track of the public addresses for the entities using the present invention. The server can be outside of the private network (e.g. server 30) or inside the private network. In one implementation, gateway 12 can perform the functionality of the server. The server can maintain a table that associates domain names (or other identifiers) with public IP addresses (or other public identities).

Figure 4:
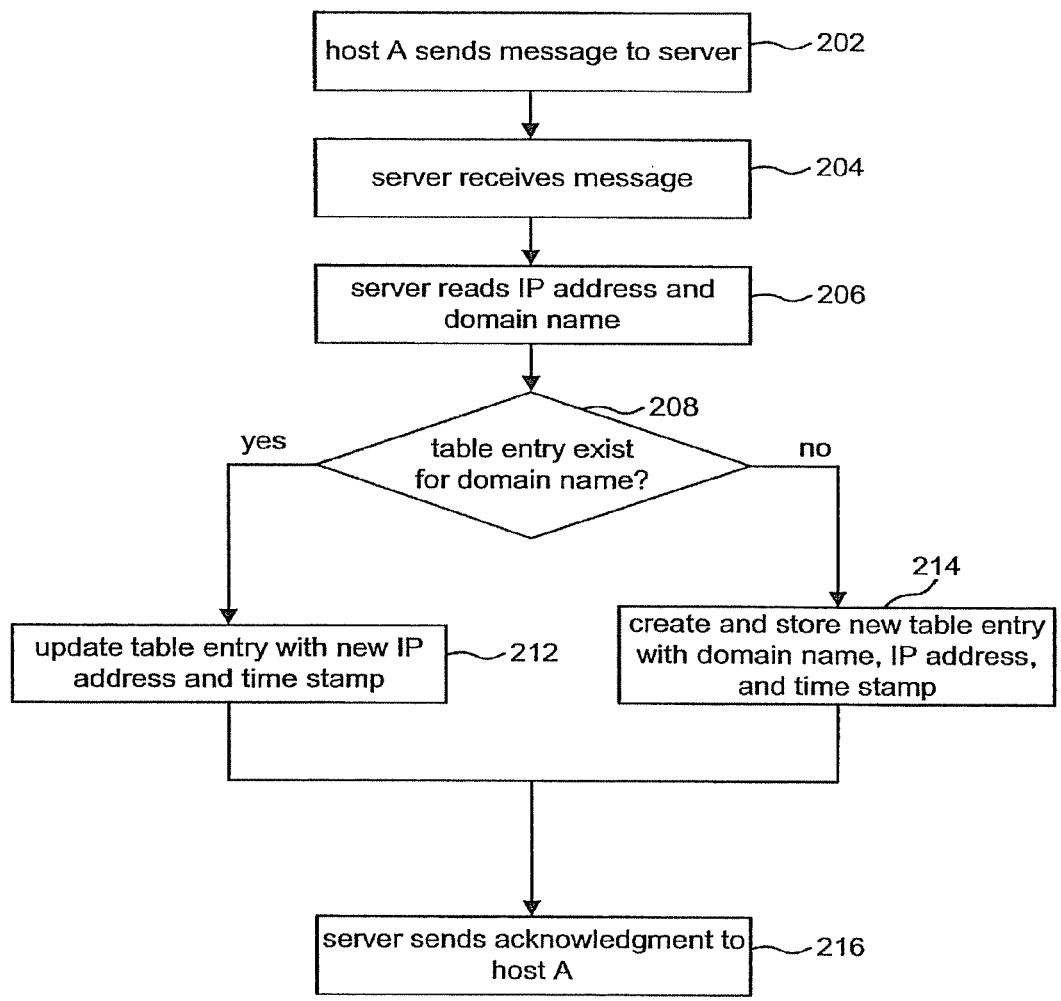
FIG. 4 is a flow chart describing one embodiment of a process for publishing a public address.

FIG. 4 provides a flowchart describing one embodiment of a process of publishing the public IP address to a server (e.g. server 30) keeping track of the public addresses for the entities using the present invention. In step 202, host A sends a message to server 30. The message includes the public IP address for host A and the domain name (or other identifier) for host A. In one implementation, the message can be an IP packet, TCP segment or UDP segment that has the domain name (or other identifier) imbedded in the packet or segment. For example, the domain name can be placed in the options field or payload of an IP packet. Alternatively, a newly designed protocol can be used which places codes in the payload portion of a UDP segment. In other implementations, the message can use protocols other than UDP or TCP/IP. In step 204, server 30 receives the message sent from host A. In step 206, server 30 reads the public IP address for host A and the domain name for host A from the message received in step 204. In step 208, server 30 determines whether an entry already exists in its table that corresponds to the received domain name. If such an entry already exists in the table, then that table entry is updated to include the newly received public IP address in step 212. The entry includes a time stamp, which is also updated in step 212 to the current time. If an entry corresponding to the domain name does not already exist in the table, then a new entry is created and stored in the table in step 214. The new entry includes the domain name and the newly received public IP address for host A. The new entry also includes a time stamp indicating when the new entry was created. Server 30 uses the time stamp to determine whether the entry is invalid or stale. An entry that is to old will not be used. After either step 212 or step 214, server 30 sends an acknowledgment to host A in step 216. The acknowledgement can be a TCP segment, UDP segment or IP packet that simply responds back to host A; a message according to a new protocol that includes an acknowledgement code in a UDP segment; or another protocol can be used. The above discussion assumes that host A is the entity responsible for publishing its new public address. In other embodiments, other entities such as gateway 12 can be responsible for publishing the new public address for host A.

After host A (or another entity) has published its new public identity, other entities outside of private network 10 can communicate with host A. These communications can be initiated by host A or an entity outside of private network 10. In one embodiment, communications between host A and entities outside of private network 10 are sent to each other directly using the public IP address published for host A. In other embodiments, communications between host A and entities outside of private network 10 are sent to each other via gateway 12, where gateway 12 provides a translation as described below. Note that in one embodiment, the public IP address for host A is routable to gateway 12.

Figure 5:
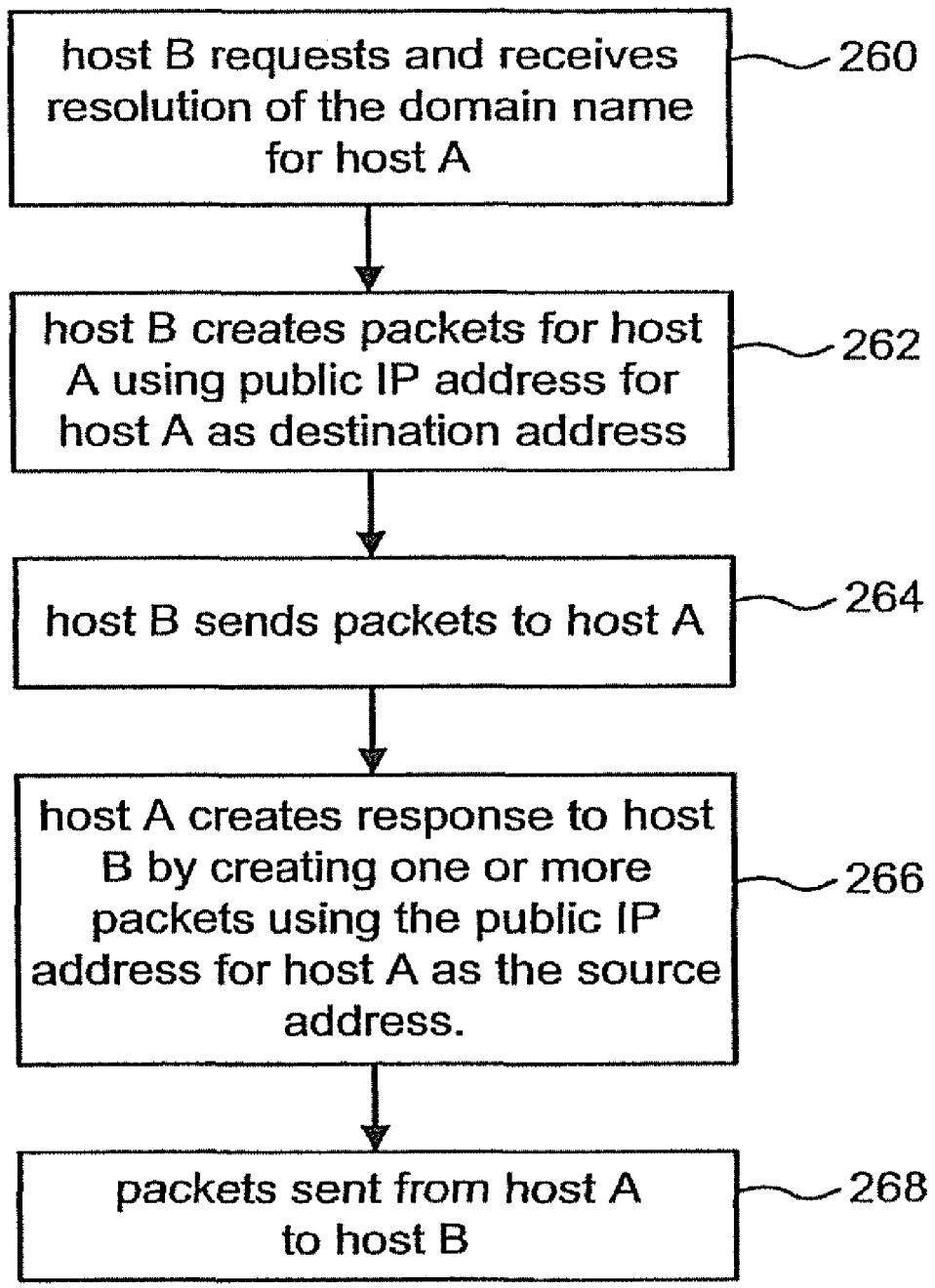
FIG. 5 is a flow chart describing one embodiment of a process for communicating using the public identity according to the present invention.

FIG. 5 is a flowchart describing one embodiment for communicating with host A that involves sending communications directly between host A and the entity communicating with host A. For example purposes, it is assumed that host B (see FIG. 1) is initiating communication with host A. Host B is an entity on the Internet with a public IP address. Alternatively, host B can be an entity in a private network using NAT or other means to communicate on the Internet. It is assumed, however, that host B is not in private network 10. In step 260 of FIG. 5, host B requests and receives resolution of the domain name for host A. In one embodiment, the domain name is resolved using the standard domain name system. In another embodiment, the domain name is resolved using server 30. As a result of the resolution of the domain name for host A, host B now has the current public IP address for host A. In step 262, host B creates one or more packets to be sent to host A. These packets include the public IP address for host A as the destination address. The IP packets are sent to host A in step 264. After receiving the IP packets, host A creates a response to host B in step 266. This response includes one more IP packets. The IP packets created by host A use the public IP address for host A as the source address. These packets created by host A are sent to host B in step 268. Host A and host B can continue to communicate with each other using steps 262-268. Note that there is no use of the private address for communication between host A and entities outside of the private network.

In one embodiment of the process of FIG. 5, host A resides in a private network that consists of a LAN with no subnets. In one implementation of this embodiment, gateway 12 routes the communication to host A. For example, the packets sent to host A are received by gateway 12, which uses its internal table to identify a MAC address for host A. Gateway 12 then forwards the communication to host A using the MAC address.

In another embodiment of the process of FIG. 5, host A resides in a network that includes subnets. In some embodiments, each subnet includes its own router. In many cases, each host in a subnet shares a common IP address prefix. This prefix includes the network number, or the network number and subnet number. In one implementation of the present invention, the public addresses to be assigned to the private hosts are grouped and reserved for each subnet so that hosts on a particular subnet will have the same prefix in their public IP address. This can be wasteful, since addresses will be reserved for a subnet and may go unused if the demand from the subnet does not meet the store of addresses. An alternative is to not reserve addresses for each subnet and not require each host in the subnet to share a common prefix in its public address. To accomplish this, when a new public address is assigned to a host, that address is treated as a host specific address. This means that in the routers, the subnet mask for the address is all ones. The table entry in the router will include the address, a subnet mask of all ones and an indication of where to route the communication. If an address matches more than one entry in a routing table, the communication will generally be routed to the match having the most ones in the subnet mask; therefore, communications with the matching address will be routed to the host having the public IP address according to the present invention.

Figure 6:
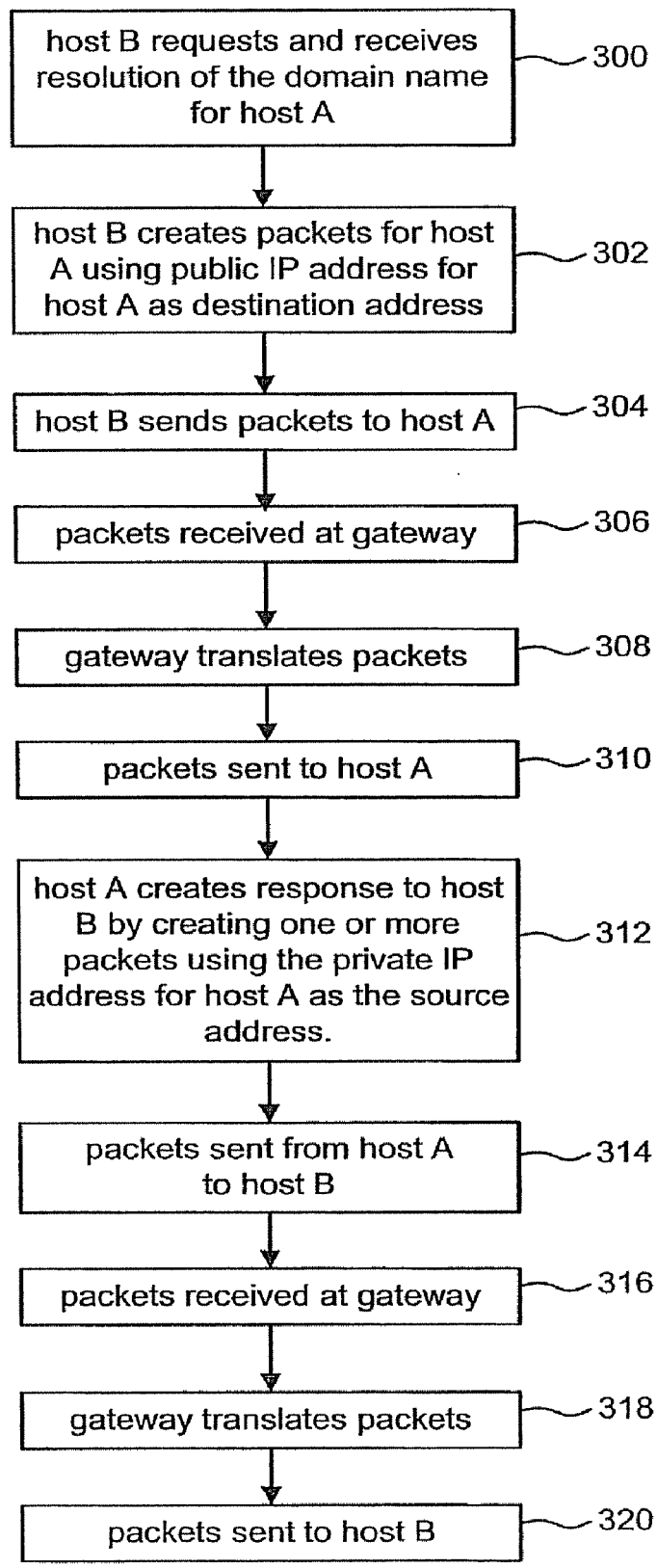
FIG. 6 is a flow chart describing a second embodiment of a process for communicating using the public identity according to the present invention.

FIG. 6 is a flowchart describing another embodiment for communicating with host A. The embodiment of FIG. 6 involves sending communications to and from host A via gateway 12. In step 300, host B requests and receives resolution of the domain name for host A. In step 302, host B creates one more packets to be sent to host A. These packets include the public IP address for host A as the destination address.

Host B sends the packets to host A in step 304. The packets are received at gateway 12 in step 306. In step 308, gateway 12 translates the packets. That is, gateway 12 stores a table which associates or binds public IP addresses with local IP addresses. Upon receiving the packets having a destination address equal to the public IP address for host A, gateway 12 will change the destination address to be the private IP address for host A. In another alternative, gateway 12 can encapsulate the packets received from host B into other packets which have a destination address equal to the private IP address of host A. In step 310, the translated packets are sent to host A using the private address for host A.

Upon receiving the packets, host A responds to the communication from host B. This response includes creating one or more IP packets in step 312. These IP packets use the private IP address for host A as the source address. The destination address for these packets is the public IP address for host B. These packets are sent from host A using the private address for host A in step 314. The packets are received at gateway 12 in step 316. Gateway 12 translates the packets in step 318. As discussed above, the translation can include encapsulating the packets or changing the source address for the packets from the private IP address for host A to the public IP address for host A. In step 320, gateway 12 sends the packets to host B using the public address for host A as the source address. Note that in the embodiments of FIGS. 6 and 7, host B is a standard prior art host that does not know about and is not programmed to implement the present invention.

Figure 7:
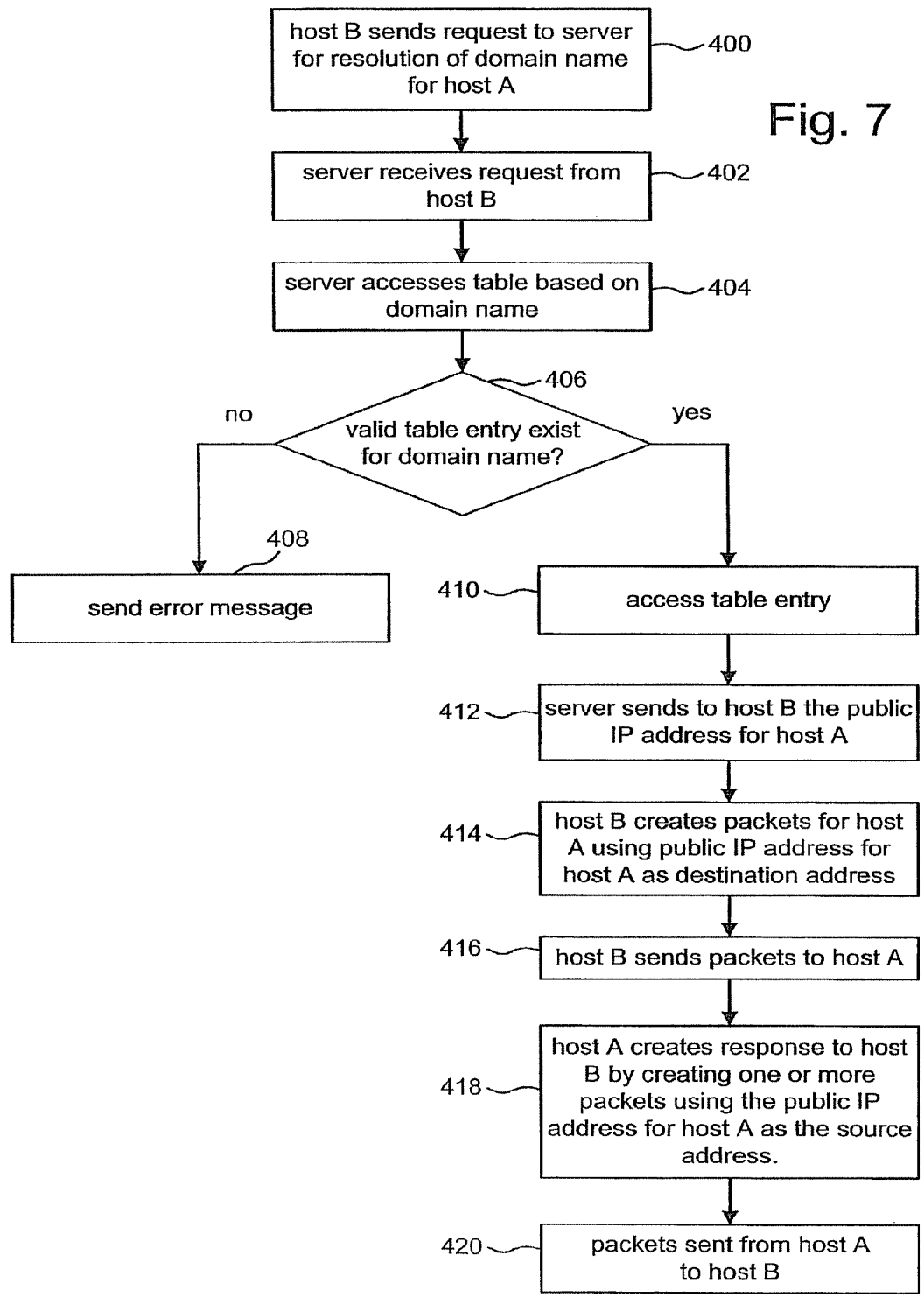
FIG. 7 is a flow chart describing a third embodiment of a process for communicating using the public identity according to the present invention.

FIG. 7 is a flowchart describing another embodiment for communicating with host A. The process of FIG. 7 contemplates the use of server 30 by host 13 in order to resolve the domain name for host A. In step 400 of FIG. 7, host B sends a request to server 30 to resolve the domain name for host A. In step 402, server 30 receives the request from host B. In step 404, server 30 accesses its table that associates domain names with public IP addresses. In step 406, server 30 determines whether an entry exists in its table for the domain name for host A. If there is no valid table entry, an error message is sent in step 408. If there is a valid entry in the table, that entry is accessed in step 410. The entry identifies the public IP address for host A. In step 412, server 30 sends a response message to host B identifying the public IP address for host A. Note that server 30 and host B can communicate using a protocol similar to that of the standard domain name system or a specific protocol (e.g. predefined codes in a payload of a UDP segment) that can be created and implemented by one skilled in the art.

In step 414, host B creates packets for host A using the received public IP address for host A as the destination address. In step 416, host B sends the created packets to host A. After receiving the IP packets, host A creates a response to host B in step 418. This response includes one more IP packets. The IP packets created by host A use the public IP address for host A as the source address. These packets created by host A are sent to host B in step 420. Host A and host B can continue to communicate with each other using steps 414-420. Note that the processes of FIGS. 5-7 can be performed one packet at a time or multiple packets at a time. The processes can also be performed using protocols other than TCP/IP.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for communicating between a first entity and a second entity, the method comprising:
    requesting to a gateway, by the first entity in a private network, a public internet protocol ("IP") address for the first entity;
    receiving, by the first entity, a public IP address of the first entity;
    receiving, at the first entity, an initial IP packet from the second entity having a public IP address, wherein the initial IP packet includes:
        a destination address including the public IP address of the first entity, and
        a source address including the public IP address of the second entity;
    generating, at the first entity, a responsive IP packet, wherein the responsive IP packet includes:
        a destination address including the public IP address of the second entity, and
        a source address including the public IP address of the first entity; and
    transmitting, from the first entity, the responsive IP packet to the second entity.

2. The method of claim 1, wherein the second entity comprises a private entity in a private network different from the private network of the first entity.

3. The method of claim 1, wherein the responsive IP packet does not include a private address of the first entity.

4. The method of claim 1, wherein the initial IP packet does not include a private address of the first entity.

5. The method of claim 1, wherein the private network of the first entity has no subnet; and
    wherein the initial IP packet includes a media access control address for the first entity.

6. The method of claim 1, wherein the first entity is in a subnet of the private network; and
    wherein the public IP address of the first entity includes a prefix associated with the subnet.

7. The method of claim 6, wherein said receiving, at the first entity, an initial IP packet from the second entity further comprises receiving the initial IP packet from a router associated with the subnet; and
    wherein the initial IP packet has been routed by the router according to a subnet mask of all ones.

8. An apparatus, comprising:
    one or more processors included in a first entity in a private network and programmed to:
    request to a gateway a public internet protocol ("IP") address for the first entity;
    receive a public IP address of the first entity;
    receive an initial IP packet from a second entity having a public IP address, wherein the initial IP packet includes:
        a destination address including the public IP address of the first entity, and
        a source address including the public IP address of the second entity;
    generate a responsive IP packet, wherein the responsive IP packet includes:
        a destination address including the public IP address of the second entity, and a source address including the public IP address of the first entity; and transmit the responsive IP packet to the second entity.

9. The apparatus of claim 8, wherein the second entity comprises a private entity in a private network different from the private network of the first entity.

10. The apparatus of claim 8, wherein the responsive IP packet does not include a private address of the first entity.

11. The apparatus of claim 8, wherein the initial IP packet does not include a private address of the first entity.

12. The apparatus of claim 8, wherein the private network of the first entity has no subnet; and wherein the initial IP packet includes a media access control address for the first entity.

13. The apparatus of claim 8, wherein the first entity is in a subnet of the private network; and wherein the public IP address of the first entity includes a prefix associated with the subnet.

14. The apparatus of claim 13, wherein the one or more processors are further programmed to receive the initial IP packet from a router associated with the subnet; and wherein the initial IP packet has been routed by the router according to a subnet mask of all ones.

15. One or more non-transitory computer-readable mediums storing software instructions that, if executed by a computing device, cause the computing device to perform operations comprising:

requesting to a gateway, by a first entity in a private network, a public internet protocol ("IP") address for the first entity;

receiving, by the first entity, a public IP address of the first entity;

receiving, at the first entity, an initial IP packet from the second entity having a public IP address, wherein the initial IP packet includes:

a destination address including the public IP address of the first entity, and a source address including the public IP address of the second entity;

generating, at the first entity, a responsive IP packet, wherein the responsive IP packet includes:

a destination address including the public IP address of the second entity, and a source address including the public IP address of the first entity; and transmitting, from the first entity, the responsive IP packet to the second entity.

16. The one or more non-transitory computer-readable mediums of claim 15, wherein the second entity comprises a private entity in a private network different from the private network of the first entity.

17. The one or more non-transitory computer-readable mediums of claim 15, wherein the responsive IP packet does not include a private address of the first entity.

18. The one or more non-transitory computer-readable mediums of claim 15, wherein the initial IP packet does not include a private address of the first entity.

19. The one or more non-transitory computer-readable mediums of claim 15, wherein the private network of the first entity has no subnet; and wherein the initial IP packet includes a media access control address for the first entity.

20. The one or more non-transitory computer-readable mediums of claim 15, wherein the first entity is in a subnet of the private network; and wherein the public IP address of the first entity includes a prefix associated with the subnet.

21. The one or more non-transitory computer-readable mediums of claim 20, wherein the software instructions for receiving, at the first entity, an initial IP packet from the second entity further comprise receiving the initial IP packet from a router associated with the subnet; and wherein the initial IP packet has been routed by the router according to a subnet mask of all ones.

* * * * *

UNITED STATES PATENT AND TRADEMARK OFFICE
CERTIFICATE OF CORRECTION

PATENT NO. : 8,090,843 B2
APPLICATION NO. : 13/087937
DATED : January 3, 2012
INVENTOR(S) : Alkhatib et al.

It is certified that error appears in the above-identified patent and that said Letters Patent is hereby corrected as shown below:

On the Cover Page, item (75), under "Inventors", in Column 1, Line 1,
delete "S" and insert -- S. --, therefor.

On the Cover Page, item (75), under "Inventors", in Column 1, Line 2,
delete "A" and insert -- A. --, therefor.

On Page 3, item (56), under "OTHER PUBLICATIONS", in Column 1, Line 8,
delete "al." and insert -- al., --, therefor.

On Page 3, item (56), under "OTHER PUBLICATIONS", in Column 2, Line 3,
delete "Harbiner" and insert -- Harbinger --, therefor.

On Page 3, item (56), under "OTHER PUBLICATIONS", in Column 2, Line 4,
delete "ww." and insert -- www. --, therefor.

On Page 3, item (56), under "OTHER PUBLICATIONS", in Column 2, Line 7,
delete "teh" and insert -- the --, therefor.

On Page 3, item (56), under "OTHER PUBLICATIONS", in Column 2, Line 15,
delete ""Advistory" and insert -- "Advisory --, therefor.

In Column 4, Line 57, delete "thing" and insert -- thing. --, therefor.

In Column 5, Line 8, delete "IF" and insert -- IP --, therefor.

In Column 5, Line 46, delete "IF" and insert -- IP --, therefor.

Signed and Sealed this
Twenty-fourth Day of July, 2012

David J. Kappos
*Director of the United States Patent and Trademark Office*

CERTIFICATE OF CORRECTION (continued)
U.S. Pat. No. 8,090,843 B2

In Column 7, Line 45, delete "to old" and insert -- too old --, therefor.

In Column 9, Line 32, delete "host 13" and insert -- host B --, therefor.